Feb. 25, 1936. A. NOVOTNY 2,032,302
VALVE
Filed Aug. 8, 1934
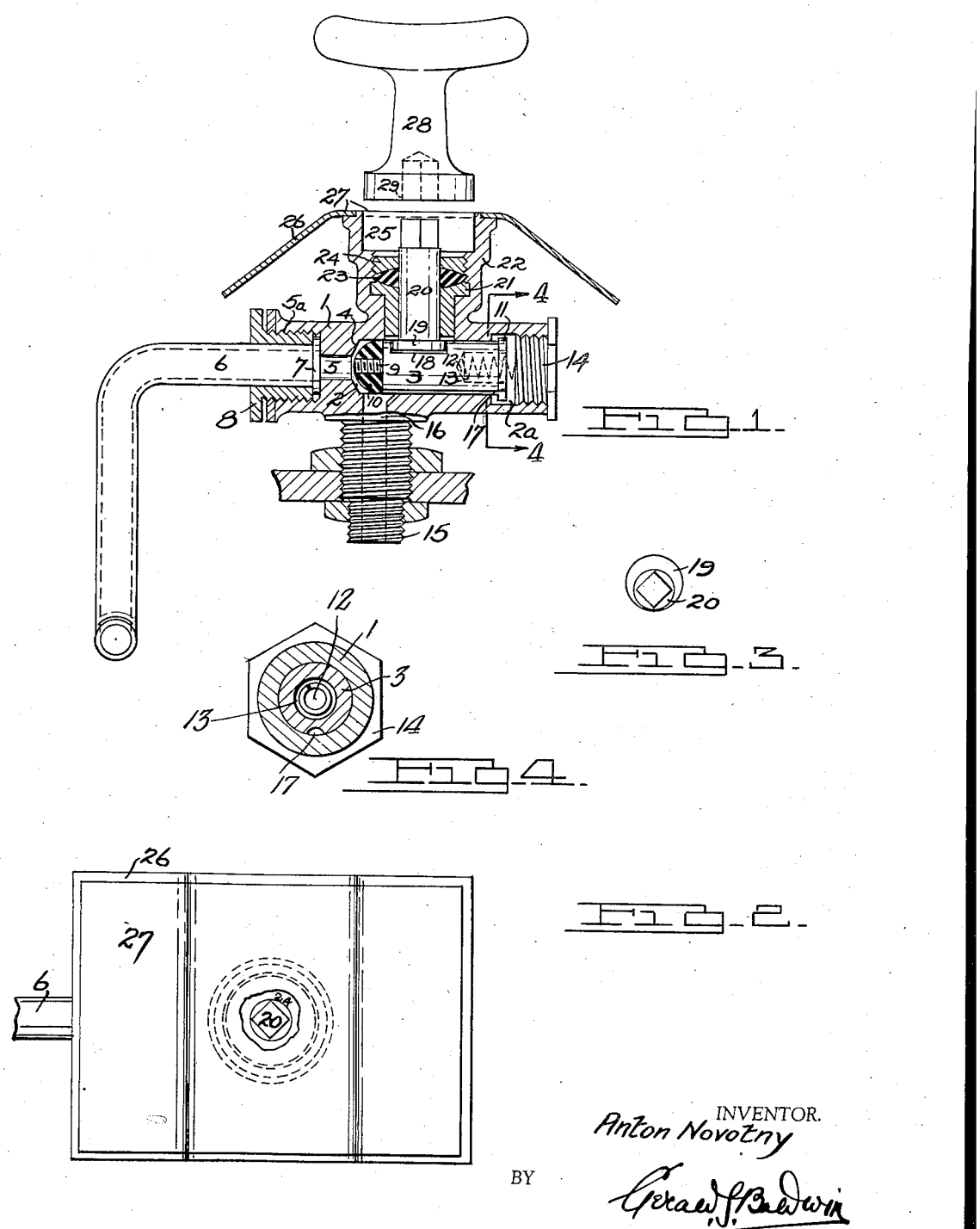
INVENTOR.
Anton Novotny
ATTORNEY.

Patented Feb. 25, 1936

2,032,302

UNITED STATES PATENT OFFICE 2,032,302

VALVE

Anton Novotny, Detroit, Mich., assignor to Detroit Gray Iron Foundry Company, Detroit, Mich., a corporation of Michigan Application August 8, 1934, Serial No. 738,994

2 Claims. (Cl. 251—40)

This invention relates to improvements in valves, and aims, among other things, to provide a relatively cheap and simple form of valve wherein an axially movable plunger is provided with a valve member at one extremity to bear upon a seat extending around a passage formed in the valve body, and a spindle extends radially from the plunger by the rotation of which the latter is moved axially; wherein the plunger has a cavity formed in its periphery to receive a disc eccentrically mounted on one extremity of the spindle so that axial movement of the plunger is caused by rotation of the spindle; wherein means are provided for preventing further movement of the plunger after the spindle and its disc have been turned a predetermined amount in either direction, thereby positively indicating when the plunger has been moved to either full open or full closed position; wherein a second passage is provided through the body through which liquid passes to the plunger aperture, and wherein means are provided permitting a flow of the liquid at all times to the extremity of the plunger remote from the valve member so that the pressure of the liquid tends to assist in retaining the said valve member upon its seat; wherein the outer exposed extremity of the spindle terminates in a counterbore formed in the valve body, and wherein a plate extends completely around the counterbore which is adapted to receive a seal extending entirely over the counterbore mouth so that the seal must be broken before access can be gained to the spindle.

With these and other objects and advantages in view which will become apparent as the specification proceeds, the invention is hereinafter more fully described with the aid of the accompanying drawing in which:

Figure 1 illustrates a sectional view of the invention.

Figure 2 is a plan view of the plate with a seal thereon.

Figure 3 is an end view of the spindle and eccentric disc.

Figure 4 is a transverse section on the line 4—4 of Figure 1.

Referring to the drawing, I designates a hollow valve body having a horizontal aperture 2 formed therein in which a plunger 3 is slidable. In alignment with the opening 2 and extending from one extremity thereof, around which a valve seat 4 is formed, is an outlet passage 5, to the outer extremity of which a discharge pipe 6 is suitably swivelly mounted. In the present instance the outer portion 5a of the passage 5 is of enlarged diameter, and a collar 7 around the inner extremity of the pipe 6 is retained against the inner face of the enlarged outlet passage portion 5a by a nut 8 which encircles the pipe 6 and is in threaded engagement with the bore of the said enlarged outlet passage portion.

Extending axially from one extremity of the plunger 3 is a threaded projection 9 having a valve member 10 thereon which is adapted to bear against the seat 4. The extremity of the plunger 3 remote from the valve member 10 has an annular flange 11 around it which is positioned in an enlarged portion 2a of the aperture 2. In the plunger 3 and through the flange 11 an axial cavity 12 is formed to receive a coil spring 13 the outer extremity of which bears against the inner face of a plug 14 by which the enlarged portion 2a of the aperture 2 is sealed.

Extending through a connection 15 integral with the body I is an inlet passage 16 which opens into the side of the aperture 2 adjacent the seal 4. The passage 16 is constantly connected with the enlarged aperture portion 2a by a longitudinal recess 17 formed in the plunger and its flange 11.

Formed in the periphery of the plunger 3 intermediately of its length is a cavity 18 in which rests a disc 19. The latter is eccentrically mounted on one extremity of a spindle 20 which extends radially from the plunger 3. The spindle is rotatably supported in a bushing 21 mounted in a tubular branch 22 integral with the body 1. 23 denotes packing upon the upper face of the bushing 21 and around the spindle 20. This packing is held in position by a gland nut 24 in threaded engagement with the bore of the branch 22. The upper end of the spindle 20, which is multi-sided, terminates within a counter-bore 25 formed in the upper portion of the branch 22; and extending completely around the mouth of the counterbore and mounted upon the body 1 is a plate 26 the opposite ends of which are preferably downturned to facilitate the emplacement of a seal 27 upon the plate to completely enclose the counterbore. 28 denotes a key the underside of which is apertured at 29 to receive the multi-sided upper extremity of the spindle 20, and the periphery of the said underside is only slightly smaller than the counterbore 25 so that when the former is inserted in the latter the seal 27 is cut around the margin of the counterbore.

The operation of the valve is briefly as follows: When the spindle 20 and the disc 19 are turned the eccentricity of the latter causes axial movement of the plunger 3 thereby moving the valve member 10 towards or from the seat 4. The spacing between the inner end of the enlarged portion 2a of the aperture 2 and the inner face of the plug 14 may be such that these parts limit the movement of the flange 11 and thus of the plunger 3 in both directions, thereby providing positive stops for the plunger in both full open and full closed positions before the said plunger has reached the limits of travel to which the eccentrically mounted disc would otherwise be capable of moving it. Or the clearance between the back of the flange 11 and the inner end of the plug 14 may be such that the opening movement of the plunger is only limited by the eccentricity of the disc 19, while contact of the flange 11 with the inner extremity of the enlarged aperture portion 2a limits the closing movement of the plunger in order to protect the valve member from undue pressure against the seat 4 and possible damage that might result to the said member therefrom. The longitudinal recess 17 maintains a connection between the inlet passage 16 and the outer face of the flange 11 so that the pressure of the liquid in the inlet passage bears against the flange 11 and assists the spring 13 in holding the valve 10 against its seat 4.

It may also be remarked that where the inlet passage into a valve body is opposite a branch through which an operating spindle extends and the outlet passage is laterally disposed to the inlet passage, considerable pressure is exerted through the spindle branch against the packing therein even when the outlet passage is open. In the present invention it will be noted that the outlet passage 5 is laterally disposed to the inlet passage 16, and the spindle branch 22 is not in alignment with the latter but lies rearwardly therefrom and is protected both by the plunger 3 and the valve member 10. The latter has a convex face and its periphery is a sliding fit in the aperture 2 so that pressure of the liquid against the convex face tends to force the peripheral portion of the member into intimate contact with the enclosing wall of the aperture thereby sealing the aperture and preventing the passage of liquid into the branch 22 when the valve is open; and when the valve is closed flow of liquid from the inlet passage 16 to the branch 22 is prevented by the plunger 3 which is a tight sliding fit in the aperture 2. Thus my construction is such that practically no liquid can pass into the branch when the valve is open or shut, and consequently the packing 23 lasts indefinitely and leakage through the branch is obviated.

While in the foregoing the preferred embodiment of the invention has been described and shown, it is understood that the construction is susceptible to such alterations and modifications as fall within the scope of the appended claims.

What I claim is:

1. A valve comprising an apertured body having an inlet passage and an outlet passage angularly disposed to one another and a valve seat formed within the body around the outlet passage, a plunger having a peripheral cavity therein intermediately of its length slidable in said body, a valve member on one extremity of the plunger to bear against the valve seat and close the outlet passage, a tubular branch opening into the hollow body farther from the outlet passage than the inlet passage is from the latter, said member being resilient and having a sliding fit in the body aperture so that when said member is moved from its seat and a flow of liquid passes from the inlet to the outlet passage the liquid forces the member into intimate contact with the enclosing wall of the aperture and prevents an escape of the liquid to the branch, a spindle rotatable in the branch, and an eccentric on the inner extremity of the spindle resting in the plunger cavity so that rotation of the spindle moves the plunger axially.

2. A valve comprising a body having an aperture therein, an outlet passage opening into one extremity of the aperture, and an inlet passage opening into said aperture adjacent the same extremity of the aperture, said aperture being enlarged at its extremity remote from the outlet passage, the outer extremity of the enlarged aperture portion being closed, a plunger slidable in the aperture having one extremity of enlarged periphery slidable in the enlarged aperture portion to limit the plunger movement in both directions, a tubular lateral branch opening into said aperture, the plunger shutting off communication between the branch and the inlet passage at all times, the enlarged end of the plunger being apertured, a spring in said aperture and having its opposite extremity bearing against the closed outer end of the enlarged body aperture portion tending to move the plunger to one of its limits of travel, and means cooperating with the plunger for moving the latter axially to close the outlet passage, said means extending through the tubular branch.

ANTON NOVOTNY.